United States Patent

[11] 3,632,895

[72] Inventor Itsuki Ban
829 Higashi-Oizumimachi, Nerima-ku, Tokyo-to, Japan

[21] Appl. No. 860,947
[22] Filed Sept. 25, 1969
[45] Patented Jan. 4, 1972
[32] Priority Sept. 30, 1968
[33] Japan
[31] 43/70138

[54] DEVICE FOR AUTOMATICALLY ADJUSTING THE RECORDING LEVEL OF A TAPE RECORDER EMPLOYING AN ENDLESS TAPE
8 Claims, 5 Drawing Figs.

[52] U.S. Cl. .......... 179/100.2 Z
[51] Int. Cl. .......... G11b 5/44
[50] Field of Search .......... 179/100.2 R, 100.2 Z, 100.1 TC, 1 VL; 323/66

[56] References Cited

UNITED STATES PATENTS

| | | | |
|---|---|---|---|
| 2,551,150 | 5/1951 | McGoffin | 323/66 |
| 3,260,954 | 7/1966 | Thompson | 179/1 VL |
| 3,488,750 | 1/1970 | Fujimoto | 179/1 VL |

FOREIGN PATENTS

| | | | |
|---|---|---|---|
| 410,629 | 10/1966 | Switzerland | 179/1 VL |

*Primary Examiner*—Stanley M. Urynowicz, Jr.
*Assistant Examiner*—Raymond F. Cardillo, Jr.
*Attorney*—Jacobs & Jacobs

ABSTRACT: An endless magnetic tape automatic recording apparatus comprising a variable resistor incorporated in a recording circuit including a magnetic head for regulating the recording level, a device for rotating an operating shaft of the variable resistor in response to the initiation of the recording to allow the variable resistor to be changed in the direction that the recording level is raised, a device for stopping rotation of the operating shaft when the recording level is at a predetermined value, and a device for rotating the operating shaft of the variable resistor in response to the termination of the recording thereby operating the variable resistor to lower the recording level.

DEVICE FOR AUTOMATICALLY ADJUSTING THE RECORDING LEVEL OF A TAPE RECORDER EMPLOYING AN ENDLESS TAPE

BACKGROUND OF THE INVENTION

The present invention relates to an endless magnetic tape automatic recording apparatus utilizing an endless magnetic tape cartridge, and more particularly to such an automatic recording apparatus wherein the recording level is automatically set to an appropriate value when the tape is drivingly transported at the initiation of the recording, and the recording level is automatically returned to zero level at the termination of the recording to stop the driving of the tape.

Disadvantages derived from the use of the endless magnetic tape is that since the endless tape can not be rewound as can a tape with a discrete beginning and end, recording can not be easily made if a good recording is not obtained due to inadequate recording level. If this has occurred, it is required to postpone the recording until the tape substantially completes one cycle thereof. As mentioned, a failure of the recording is mostly due to the inadequate recording level. Such being the circumstances, the highest technical art is required to eliminate such failure. To this end, the endless magnetic tape player must be capable of automatically adjusting the recording level. The prior art has proposed the provision of a circuit in the player apparatus, which expands a weak input signal to the recording circuit and compresses a strong input signal thereto. However, with such a circuit, the fidelity of the recording is damaged to result in dissatisfactory recording, especially in case of a music composition or the like. Therefore, it is preferable that adjustment of the recording level of the recording circuit is made by a variable resistor used for gain control of a conventional amplifier.

SUMMARY OF THE INVENTION

It is, therefore, a principal object of the present invention to provide an endless magnetic tape automatic recording apparatus wherein when a variable resistor for adjusting the recording level of the recording circuit is changed in the direction that the recording level is increased at the initiation of the transportation of the tape, such change of the variable resistor is stopped in response to a detecting circuit detecting that the recording level is at an appropriate value to automatically set the recording level at the appropriate value, and on the other hand, when the variable resistor is changed in the direction that the recording level is lowered, such change is stopped in response to detecting that the recording level is at zero level to stop the transportation of the tape.

Another object of the invention is to provide an endless magnetic tape automatic recoding apparatus wherein a frictional wheel is rotatably mounted to a swing lever in opposition to a first and a second rotating member rotatable in the reversed direction to each other by a motor which rotatably drives a capstan to drivingly transport the tape, a reducing lever connecting the frictional wheel to the operating shaft of the variable resistor is provided in the swing lever, and the operating shaft is rotatably driven by abutment of the frictional wheel with the first rotating member or the second rotating member by means of the swinging of the swing lever.

Another object of the invention is to provide an endless magnetic tape automatic recording apparatus wherein the frictional wheel abuts against the first rotating member and thereby is rotated by attractively retaining the swing lever with a electromagnetic device, the operating shaft of the variable resistor is thus rotated in the direction that the recording level is raised, the electromagnetic device is actuated in response to the detecting circuit to release the attractive retention and the swing lever is, therefore, restored to keep the frictional wheel away from the first rotating member thereby rotation of the operating shaft.

Still another object of the invention is to provide an endless magnetic tape automatic recording apparatus wherein the swing lever is rotated to a position where the frictional wheel abuts against the second rotating member by the elastic force of a tension spring, and the variable resistor is changed in the direction that the recording level is lowered by rotation of the operating shaft of the variable resistor at that time above mentioned.

Yet another object of the invention is to provide an endless magnetic tape automatic recording apparatus wherein the endless magnetic tape cartridge inserted in the recording position is removed from the recording position by a lever having a fingerlike portion pressing the leading edge of the cartridge at the termination of the recording.

These and further features, advantages and objects of the invention will become more apparent from the following description of an exemplary embodiment thereof illustrated in the drawings, in which:

DESCRIPTION OF THE PREFERRED EMBODIMENTS

Figure 1:
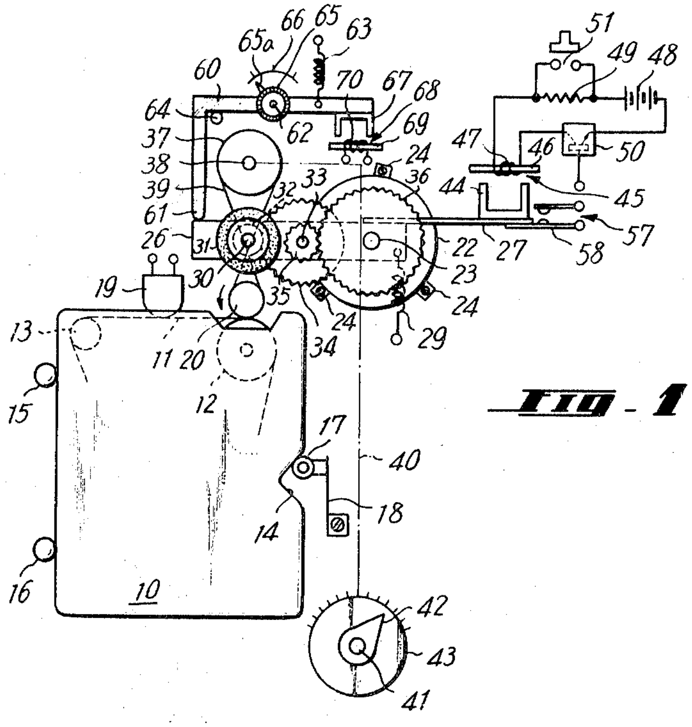
FIG. 1 is a schematic plan view of one illustrative embodiment of the invention.

FIG. 1 shows an apparatus according to the present invention applied to the tape recorder which, utilizing an endless magnetic tape cartridge, contains a slot or tunnel opening (not shown) into which an endless tape cartridge 10 is readily inserted for play. The cartridge 10 includes a generally rectangular housing with a centrally disposed reel assembly (not shown) on which an endless magnetic tape 11 is wound and unwound in conventional manner. The endless tape 11 passes over a pinch roller 12 and guide 13. The pinch roller 12 and guide 13 are disposed adjacent the leading edge of the cartridge whereat the cartridge sidewall is cut away or dispensed with and the endless tape 11 is extended from the center of the hub of the reel (not shown) about the guide 13 and thence about the pinch roller 12 back to the outer periphery of a roll formed by the tape wound about the hub. Insertion of the cartridge into the slot in the recorder results in that the cartridge is mounted on a deck (not shown) by means of guides 15, 16 and a retention guide 17 provided on the deck as shown in the drawing. The retention guide 17 is provided on a leaf spring 18 on the deck and is pressed by bias of the leaf spring 18 into a notch 14 on the sidewall of the cartridge 10. The cartridge 10 is urged in the forward direction by the force of the retention guide 17 which abuts against the inclined wall of the notch 14 thereby establishing play action of the endless tape 11 with a magnetic head 19 and a capstan 20. The capstan 20 may be driven by a motor 21 (FIG. 2), and is rotated at a preset constant speed to transport the magnetic tape 11 at its predetermined linear playing speed. The capstan 20 firmly presses the tape 11 against the pinch roller 12 in its drive relation.

Figure 2:
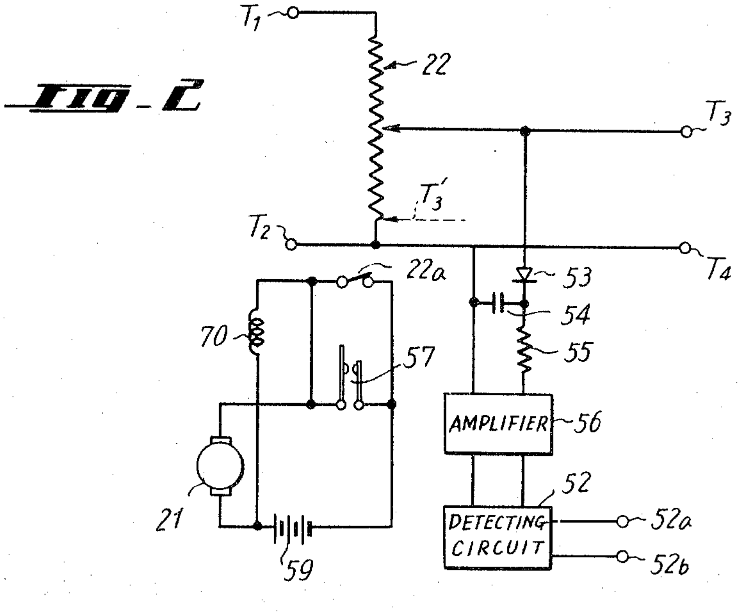
FIG. 2 is an electric circuit diagram for the apparatus shown in FIG. 1.

A variable resistor 22 is fixed on a body member 25 (FIG. 3) through mounting piece 24. The variable resistor 22 is provided in a recording amplifier which amplifies a signal detected, for instance, by a microphone and furnishes an output to the recording head 19. As seen in FIG. 2, the input terminals of the variable resistor 22 are designated by $T_1$ and $T_2$ and the output terminals of the resistor 22 designated by $T_3$ and $T_4$. When an input signal is furnished across the input terminals $T_1$ and $T_2$, a variable output is obtained between the output terminals $T_3$ and $T_4$ with the adjustment of the variable resistor 22. In other words, depending on the intensity of the input signal across the input terminals $T_1$, $T_2$, the gain control for the recording amplifier can be obtained by adjusting the variable resistor 22, and the recording level in the magnetic tape recorded through the recording head 19 can be adjusted by the variation of the variable resistor 22.

Figure 3:
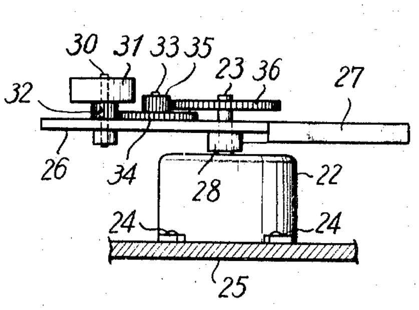
FIG. 3 is a side elevational view of the driving mechanism of the variable resistor shown in FIG. 1.

In FIGS. 1 and 3, numeral 26 designates a swing lever having a leaf spring 27 at one end thereof, and is supported freely swingable around an operating shaft 23 of the variable resistor 22 through a sleeve 28, and is urged in the clockwise direction by a tension spring 29. Rotatably mounted on the swing lever 26 are an axis 30 to which are fixed a rubber covered covered frictional wheel 31 and a gear 32, and an axis 33 to which are fixed gears 34, 35. The gear 32 meshes with the gear 34 and the gear 35 meshes with a gear 36 fixed to the shaft 23 of the variable resistor 22. The gears 32, 34, 35 and 36 constitute a reduction gearing and rotation of the frictional wheel 31 is reduced to be imparted to the operating shaft 23. The frictional wheel 31 may abut against the capstan 20 when the swing lever 26 is swung in the counterclockwise direction in a manner as described hereinafter, and the frictional wheel is caused to be rotatably driven by the capstan 20 in the clockwise direction. On the other hand, the frictional wheel 31 may abut against a pulley 37 which is rotatably driven by capstan 20 through a belt 39 and it is then rotatably driven by the pulley 37 when the swing lever is swung in the clockwise direction in a manner as described hereinafter. The pulley 37 and a shaft 38 is coupled to a shaft 41 with a pointer 42 through a reduction mechanism (not shown), as shown by the dotted line. Accordingly, the pointer 42 is caused to be rotated with rotation of the capstan 20 whereby the running distance of the tape 11 can be measured by divisions 43.

A U-shaped magnetic member 44 is fixed to the right-hand side of the leaf spring 27, and an electromagnetic device 45 is firmly mounted opposing the end portions of the magnetic member 44. The magnetic member 44 and the electromagnetic device constitute means for locking the swing lever 26 against the elasticity of the spring 29. The electromagnetic device 45 is constituted by a core 46 having a coil 47. The coil 47 is connected to an electrical source 48 through a resistor 49 and a transistor 50, and is normally supplied with a relatively weak current. The intensity of the magnetic flux generated in the coil 47 which receives an electric current from the source 48 via the resistor 49 and the transistor 50 is so adapted that it can attract intensely and engage the magnetic member 44 when the magnetic circuit of the core 45 is closed by the magnetic member 44, but it cannot attract the magnetic member 44 when the magnetic member 44 is away from the coil. Assuming that a push button switch 51 connected in parallel with the resistor 49 is manually closed, a large current flows in the coil 47, and the magnetic member 44 on the leaf spring 27 is attracted by the electromagnetic device 45 against the elastic force of the spring 29. After release of pushbutton 51, the magnetic member 44 is maintained in a state of being attracted by and engaged with the electromagnetic device 45 by means of a relatively weak current flowing through the resistor 49 and the transistor 50. The transistor 50 is a NPN-transistor which has three electrodes, collector, base and emitter; the collector being connected through the coil 47 and the resistor 49 to the positive pole of the electric source 48; the emitter being connected to the negative pole of the electric source 48 and an output terminal **52*b* of a detecting circuit 52 (FIG. 2); and the base being connected to an output terminal 52*a* of the detecting circuit 52**.

The detecting circuit 52 is formed of, for instance, a Schmidt circuit. As seen from FIG. 2, the signal obtained between the output terminals $T_3$ and $T_4$ may be applied to the input side of the detecting circuit 52 after the signal has been averaged by a rectifying circuit consisting of a diode 53, a capacitor 54 and a resistor 55 and amplified by an amplifier 56. The detecting circuit 52 produces a potential difference between the output terminals **52*a* and 52*b* when a voltage applied to the input side is lower than a predetermined value, however, if the voltage is higher than the predetermined value, the potential difference between the output terminals 52*a* and 52*b* becomes zero. The output voltage of the detecting circuit 52 is nil to thereby retard the flow of base-to-emitter current of the transistor 50 so that the latter is brought to cutoff condition since the path between the collector and the emitter is disconnected. Accordingly, the transistor 50 in cutoff condition prevents the current from flowing onto the coil 47, and the electromagnetic device 45 loses its attractive force for the magnetic member 44**.

So long as the electromagnetic device 45 attracts the magnetic member 44, the frictional wheel 31 abuts against the capstan 20 and an electrical switch 57 with an arm 58 operated by the end portion of the leaf spring 27 is closed. Closing of the electrical switch 57 allows the current to be supplied from an electric source 59 (FIG. 2) to the motor 21. As a result, the capstan 20 is rotatably driven by the motor 21 and at the same time the frictional wheel 31 is also rotatably driven by the capstan 20. Since the rotation of the frictional wheel 31 is transmitted to the operating shaft 23 of the variable resistor 22 through the reduction gearing, the operating shaft rotates, changing the variable resistor 22. With change in the variable resistor 22, the recording level may be gradually increased.

When the transistor 50 is brought to the cutoff condition and the electromagnetic device 45 releases attraction of the magnetic member 44, the swing lever 26 is rotated in the clockwise direction by elastic force of the tension spring 29, and rotation of the swing lever 26 is prevented by engagement of a portion of the swing lever with one end portion 61 of a L-shaped lever 60. For the period when the swing lever is returned and engages the lever 60, the frictional wheel 31 is away from the capstan 20 and no change is made in the position of the variable resistor 22. With return of the swing lever 26, the switch 57 is opened whereas an electric switch **22*a* (FIG. 2) received in the variable resistor 22 is closed whereby the motor 59 is actuated and the capstan 20 continues to rotate. The switch 22*a* is caused to be opened when a slider connected to the output terminal $T_3$ of the variable resistor 22** is in the position indicated by the dotted line $T_3$.

The lever 60 is swingably pivoted to an upright pin 62, and is urged in the counterclockwise direction by a tension spring 63, but the swinging of the lever 60 is blocked by a stopper pin 64. The tension spring 63 has an elastic force sufficient to allow the lever 60 to prevent pivotal movement of the swing lever 26. A knob 65 is with an index **65*a* is firmly mounted to the lever 60 and a division 66 is provided in a fixed portion (not shown) to be aligned with the index. Manual rotation of the lever 60 in the clockwise direction through the knob 65 causes a U-shaped magnetic member 67 provided on the lever 60 to be attracted to an electromagnetic device 68 to prevent the lever 60 from returning due to elasticity of the spring 63. As the lever 60 is rotated in the clockwise direction, the swing lever 26 is swung by the elasticity of the spring 29 in the clockwise direction and the frictional wheel 31 abuts against the pulley 37 and then is rotated. At this point, the direction in which the frictional wheel 31 is rotated, is reversed to the direction that is is rotatably driven when abutting against the capstan 20 so that the variable resistor 22 is varied to decrease the recording level. The electromagnetic device 68 is constituted by a core 69 on which a core 70 is wound, said core 70 having an electrical wiring as shown in FIG. 2. Namely, the coil 70 is connected to the electrical source 59 through the switch 22*a* and or the switch 57. The intensity of the magnetic flux generated in the coil 70 which receives a current from the source 59 is so adapted that it can attract intensely and engage with the magnetic member 67 when the magnetic circuit of the core 69 is closed by the magnetic member 67, but it cannot attract the magnetic member 67 when the magnetic member 67 is away from the core 69**.

During the period when lever 60 is retained by the electromagnetic device, the operating shaft 23 is rotated with rotation of the frictional wheel 31 and the slider of the variable resistor 22 is brought to a position as indicated at $T_3$ (FIG. 2) thereby opening the switch **22*a*. Upon opening of the switch 22*a*, the motor 21 is deactuated because the motor is not supplied with current from the source 59**. On the other hand, the current is disconnected from the coil 70 by opening of the switch 22a and the attractive force of the electromagnetic device 68 for the magnetic member 67 is thus cut off. Consequently, the lever 60 is returned by elastic force of the tension spring 63. Simultaneously with restoration of the lever 60 the swing lever 26 is thereby restored to keep the frictional wheel 31 away from the pulley 37.

Next, a general function of the apparatus shown in FIGS. 1, 2 and 3 will be described.

When the pushbutton switch 51 is closed by manual operation thereof, a heavy current is flowed to the coil 47 of the electromagnetic device 45 from the source 48 while the magnetic force is generated in the electromagnetic device 45 for attracting the magnetic member 44 on the leaf spring 27 against the elastic force thereof. As a result, the swing lever 26 is swung against the elastic force of the spring 29, the frictional wheel 31 is urged to the capstan 20, the electrical switch 57 is closed, and the magnetic member 44 is attracted to the electromagnetic device 45. With closing of the switch 57, the motor 21 is energized and the capstan 20 is rotated. Rotation of the capstan 20 initiates transportation of the endless tape 11 in the cartridge 10 and at the same time the frictional wheel 31 is rotatably driven. Rotation of the frictional wheel 31 is transmitted through the reduction gear trains 32, 34, 35 and 36 to the operating shaft 23 of the variable resistor 22 to rotate the shaft 23. The resistance of variable resistor 22 changes with the rotation of the operating shaft 23, and the recording level rises gradually causing a so-called "fade in." Assuming that the recording level reaches an appropriate value, the output voltage between the output terminals 52a, 52b of the detecting circuit 52 is zero and the transistor 50 is brought to the cutoff condition whereby the coil 47 is no longer supplied with current. Thus, the attractive engagement of the magnetic member 44 by the electromagnetic device 45 is released, and the swing lever 26 is restored by the elastic force of the spring 29. With restoration of the swing lever 26, the frictional wheel 31 retracts from the capstan 20, the variation of the variable resistor 22 ceases, and after which the variable resistor 22 is set at a position of an appropriate recording level. On the other hand, the switch 57 is opened by restoration of the swing lever 26, however, the electrical switch 22a has been closed by rotation of the operating shaft 23 of the variable resistor 22 so that the motor keeps rotating. As seen from the foregoing description, by manually operating the pushbutton switch 51, the recording lever is caused to "fade in" to be automatically to an appropriate level by which the endless tape 21 is recorded. The apparatus in such condition is shown in FIG. 1.

At the completion of the recording, if the knob 65 is manually operated and the lever 60 is rotated in the clockwise direction against the bias of the spring 63, the lever 60 is attracted by and engaged with the electromagnetic device 68 through the magnetic member 67. Accordingly, the swing lever 26 is rotated in the clockwise direction under the elastic force of the spring 29, and then the frictional wheel 31 abuts against the pulley 37 which is rotatably driven by the capstan 20 via the belt 39. Thus, the frictional wheel 31 is rotated and its rotation is imparted through the reduction gearing to the operating shaft 23 of the variable resistor 22 thereby rotating the shaft 23. The resistance of the variable resistor 22 changes with the rotation of the operating shaft 23, the recording level is lowered gradually and is caused to "fade out." After the operating shaft 23 is rotated and returned to an initial position where the recording level reaches zero level, the electrical switch 22a within the variable resistor 22 is opened. With opening of the switch 229, the motor 21 and the electromagnetic device are not supplied with current thereby terminating rotation of the capstan 20 and returning the lever 60 under the elastic force of the spring 63. With return force of the lever 60, the swing lever 26 is swung against the elastic force of the spring 29 so that the frictional wheel 31 is away from the pulley 37.

According to the apparatus as shown in FIGS. 1, 2 and 3, as the recording is initiated, the endless tape 11 in the cartridge 10 is drivingly transported and the recording level is "faded in" and automatically set to an appropriate value whereupon the tape 11 is recorded at an appropriate recording level. At the termination of the recording, the recording level is "faded out" and automatically returned to zero value while rotation of the capstan 20 is arrested to terminate the transport of the tape 11.

Figure 4:
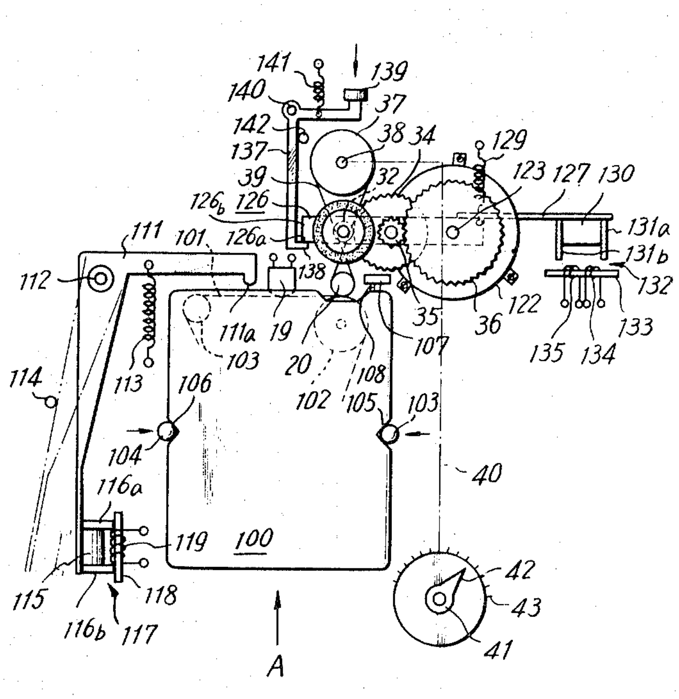
FIG. 4 is a schematic plan view of another embodiment of the apparatus according to the present invention.
Figure 5:
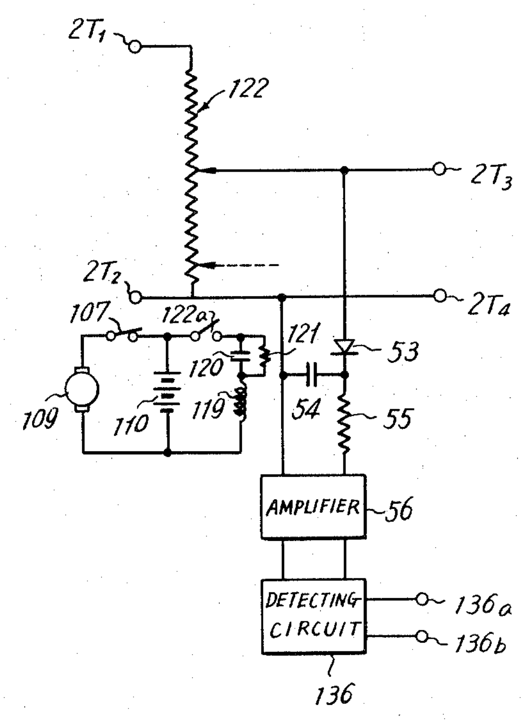
FIG. 5 is an electric circuit diagram for the apparatus shown in FIG. 4.

FIGS. 4 and 5 show another embodiment different from that of the recorder according to the invention shown in FIGS. 1 to 3. The details of the embodiment will be hereinafter described. For the purpose of facilitating understanding, similar numerals are used in FIGS. 4 and 5 illustrate like parts in FIGS. 1 to 3.

The recorder contains a slot or tunnel opening (not shown) into which an endless tape cartridge 100 is readily inserted for recording. The cartridge 100 includes a generally rectangular housing with a centrally disposed reel assembly (not shown) on which endless magnetic tape 101 is wound and unwound in a conventional manner. For driving the tape 101, there is provided a driving capstan 20 which extends perpendicular to the path of movement of the tape and which engages the tape for pulling the tape across or past the recording head 19. A pinch roller 102 and a guide 103 are disposed adjacent the leading edge of the cartridge 100 whereat the cartridge sidewall is cut away or disposed with and the tape 101 is extended from the center of the hub of the reel (not shown) about the guide 103 and thence the pinch roller 102 back to the outer periphery of an roll formed by the tape 101 wound about the hub.

Insertion of the cartridge 100 from the direction shown by the arrow A into the "record" position causes retention member 103, 104 to be pressed into notches 105, 106 on the sides of cartridge 100. The retention members 103, 104 are urged in the direction of the arrow by the spring (not shown) on deck (not shown) on which the cartridge 100 rests. In this manner, the cartridge 100 is ensured to be in the "record position." When the cartridge 100 is in the "record" position, the tape 101 engages the head 19 and the capstan firmly presses the tape 101 against the pinch roller 102 in its drive relation.

An electric switch 107 has an actuater 108 that is actuated by the one corner of the cartridge 100 when in the "record" position, as shown. When the switch 107 is closed by the cartridge 100 in the "record" position, a motor 109 (FIG. 5) for rotatably driving the capstan 20 is energized from an electric source 110 (FIG. 5.). When the cartridge 100 is removed from the "record" position, the switch 107 is opened. A substantially L-shaped lever member 111 is pivoted rotatably on a pin 112, and is urged in the clockwise direction by a tension spring 113, but rotation of the lever member is blocked by a stopper pin 114. When a fingerlike portion 111a abuts against the leading edge of the cartridge 100 after the cartridge 100 has inserted into the "record" position, the lever member 111 is rotated from a normal or first position (indicated by the dotted line) to a second position (shown by solid line) against the elastic force of the spring 115. The lever member 111 is magnetically retained in its second position by means of electromagnetic device 117. Namely, to the lever member 111, there are fixed a permanent magnet 115 and the yokes 116a 116b thereof which are opposed to an electromagnetic device 117 wound with a coil on a steel plate 118 fixed to a fixed portion (not shown) on the deck. Rotation of the lever member 111 to the second position cause the yokes 116a 116b of the permanent magnet 115 to close its magnetic circuit by the steel plate 118, and permanent magnet 115 is thus attracted and engaged to electromagnet 117. The coil 119, as shown in FIG. 5, is connected through a parallel connection of a capacitor 120 with a resistor 121 and an electrical switch 122a to the electrical source 110. The electrical switch 122a is received in a variable resistor 122 similar to the variable resistor 22 (FIGS. 1 to 3 and is closed when the variable resistor 122 is varied to the condition by which the recording level is to be zero level. After the switch 122a is closed, a heavy current flows pulsatingly into the coil 119 until the capacitor 120 is energized. A large magnetic flux in the direction to cancel the magnetic flux due to the permanent magnet 115, is generated from the coil 119 a the magnetic attraction between the yokes 116a, 116b and the steel plate 118 are released. Thus, the lever member is restored to the first position by the elastic force of the spring 113. Upon restoration of the lever member 111, the leading edge of the cartridge 100 is pushed by the fingerlike portion 111a and ejected from the "record" position.

The variable resistor 122 is provided in a recording amplifier which amplifies a signal detected, for instance, by a microphone and furnishes an output to the recording head 19. The input terminals of the variable resistor 122 are designated by $2T_1$ and $2T_2$ (FIG. 5) and the output terminals of the resistor 122 are designated by $2T_3$ and $2T_4$. A swing lever 126 similar to the swing lever 26 (FIGS. 1 and 3) is supported freely swingable around an operating shaft 123 of the variable resistor 122, and is urged in the counterclockwise direction by a tension spring 129. Mounted to the swing lever 126 as in the same manner of the swing lever 26 (FIGS. 1 and 3) are the frictional wheel 31 and the reduction gear trains 32, 34, 35 and 36. A permanent magnet 130 and its yokes 131a and 131b are provided on a leaf spring 127 fixed to the swing lever 126. An electromagnetic device 132 is rigidly mounted to a fixed portion (not shown) to oppose the yokes 131a, 131b. The electromagnetic device 132 is constituted by a core 133 having a first and second coil 134, 135. The current is flowed in pulse manner to the first coil 134 when the switch 108 is closed by means of a control circuit (not shown) including the electrical switch 108. The current to the first coil 134 generates a magnetic flux from the coil to allow that magnetic flux to be added to the magnetic flux due to the permanent magnet 130 to produce a strong attractive force between the yokes 131a, 131b and the core 133, and the swing lever is thus swung against the elastic force of the spring 129. With pivotable movement of the swing lever 126, the core 133 is attracted to the swing lever 126 whereby the latter is stopped and retained by preventing rotation of the lever 126 by spring 129. At this time, the frictional wheel 31 is rotatably driven by engaging it with the pulley 37. Rotation of the swing lever 126 is imparted through the reducing gear trains 32, 34, 35 and 36 to the operating shaft 123 of the variable resistor 122 to change the latter thereby increasing the recording level.

The second coil 135 is energized by an output signal of a detecting circuit 136 (FIG. 5) consisting of, for instance, a Schmidt circuit. A signal obtained between the output terminals $2T_3$ and $2T_4$ of the variable resistor 122 may be applied to the input side of the detecting circuit 136 as is the same as the detecting circuit 52 (FIG. 2) after that signal has been averaged by the rectifying circuit consisting of the diode 53, capacitor 54, and the resistor 56 and amplified by the amplifier 56. In this instance, the detecting circuit 136 is different from the detecting circuit 52 (FIG. 3) in that it maintains a potential difference at zero between the output terminals 136a and 136b when the signal voltage applied to the input side of the detecting circuit is less than a predetermined value and the potential difference is produced between the terminals 136a and 136b when the signal voltage is more than the voltage value. If the potential difference is produced between the terminals 136a and 136b of the detecting circuit 136, the current is drained to the second coil 135. Thus, the second coil 135 generates a magnetic flux to cancel the magnetic flux due to the permanent magnet 130. This releases the attractive force between the yokes 131a, 131b and the core 133 so that the swing lever 126 is rotated in the counterclockwise direction under the elastic force of the tension spring. This rotation of the swing lever 126 is blocked by the corner 126a of the swing lever 126 being engaged with a bent end 138 of a lever 137. The lever 137 is provided with a push button 139 at one end of the lever is pivoted swingably to a pin or shaft 140 and is urged in the counterclockwise direction by a spring 141, but the swinging of the lever is blocked by a stopper pin 142. Upon manual depression of the pushbutton 139 in the direction of the arrow the lever 141 is caused to swing about the shaft 140 in the clockwise direction against the elastic force of the spring 141 whereby the bent end 138 is away from the corner 126a of the swing lever 126. Accordingly, the swing lever 126 is counterclockwise swung by the elastic force of the spring 129 to a position where the frictional wheel 31 abuts against the capstan 20. Assuming that the frictional wheel 31 is in the position where it abuts against the capstan 20, if depression of the push button 139 is released the lever 137 is returned by the elastic force of the spring 141 to a position where the end of the bent end 138 engages the edge 126b of the swing lever 126.

Now, the mode of operation of the tape recorder shown in FIGS. 4 and 5 will be hereinafter detailed.

Assuming that the cartridge 100 is inserted in the direction of the arrow A and brought to the "record" position, the switch 107 is closed and the lever 111 is rotated from the above mentioned first position to the second position against the elastic force of the spring 113 and then is retained in the second position by a magnetic attraction between the yokes 116a, 116b and the core 118. Closing of the switch 107 energizes the motor 109 to initiate rotation of the capstan 20 with the endless tape 101 in the cartridge 100 being drivingly transported and, as already mentioned, the pulse current is flowed to the first coil 134 of the electromagnetic device 132 to produce a strong attractive force between the core 133 and the yokes 131a, 131b of the permanent magnet 130 allowing the swing lever 126 to be rotated in the clockwise direction and then to be magnetically retained by the electromagnetic device 132. This causes the frictional wheel 31 to abut against the pulley 37 for its rotation, and on the other hand, the edge 126b is away from the end of the bent end 138 of the lever 137 so that the lever 137 is rotatably returned by the elastic force until it is retained by the stopper pin 142.

With rotation of the operating shaft 123 of the variable resistor 122 as the frictional wheel 31 is rotated, the recording level rises gradually and to cause a so-called "fade in." When the recording level reaches an appropriate value, an output voltage is generated between the output terminals of the detecting circuit 136, and said output voltage is applied to the second coil 135 of the electromagnetic device 132. Therefore, a current flows to the second coil 135, and a magnetic flux is produced from the second coil 135. This magnetic flux cancels the magnetic flux due to the permanent magnet 130 and the swing lever 126 is restored by the elastic force of the spring 129. With restoration of the swing lever 126, the frictional wheel 31 retracts from the capstan 20. The variation of the variable resistor 122 ceases and after which the variable resistor 122 is set to a condition of an appropriate recording level. In this case, the component parts arranged in such position are shown in FIG. 4.

At the completion of the recording, the push button 139 is manually depressed in the direction of the arrow to rotate the lever 137 in the clockwise direction releasing engagement of the bent end 138 of the lever 137 with the corner 126a of the swing lever 126 whereby the swing lever 126 is counterclockwise rotated by the elastic force of the spring 129 and its rotation is stopped by the frictional wheel 31 abutting against the capstan 20. Rotation of the frictional wheel 31 at this point rotates the operating shaft 132 in such a direction to lower the recording level. And, when the recording level is at the zero level, the switch 122a within the variable resistor 122 is closed. Closing of the switch 122a causes current to flow from the source 110 through the capacitor 120 to the coil 119 of the electromagnetic device 117 to generate a magnetic flux from the coil 119 to cancel the magnetic flux due to the permanent magnet 115. Therefore, the magnet attraction between the yokes 116a, 116b and the core 118 of the electromagnetic device 117 is released and the lever member 111 is restored to the first position by the elastic force of the spring 113. The lever member 111 is restored to the first position at the same time the leading edge of the cartridge 100 is depressed by the fingerlike portion 111a of the lever member 114. As a result, the cartridge 100 is away from the "record" position to open the electrical switch 107 terminating actuation of the motor 109.

As described above, the recorder shown in FIGS. 4 and 5, as in the same manner of the recorder in FIGS. 1, 2 and 3, is capable of recording the endless tape 101 in the cartridge 100 with the recording level being automatically set to an appropriate level.

The invention and its attendant advantages have just been described above, but it will be understood that the present invention is not limited to the example shown in the drawings, and various changes and modifications will be made without departing from the true spirit and scope of the present invention as defined by the appended claims.

What is claimed is:

1. An endless magnetic tape automatic recording apparatus including tape driving means having a capstan for rotatably driving an endless magnetic tape contained in a cartridge and an electrical motor for rotatably driving the capstan, and a recording circuit provided with a magnetic head therein, comprising: a first rotating member and a second rotating member spaced from one another and each rotatable by said motor, said first rotating member and second rotating member being rotatable in opposite directions; a variable resistor provided in said recording circuit, said variable resistor having a rotatable operating shaft by whose rotation the recording level of the signal recorded in said magnetic tape through said magnetic head is varied; means for selectively imparting rotation of said first rotating member and second rotating member to the operating shaft of the variable resistor, said selecting means including a pivotally mounted swing lever a frictional wheel rotatably mounted on said swing lever, said swing lever being adapted to be swung selectively to bring said frictional wheel into abutment with said first or second rotating member, and a reducing gearing for transmitting rotation of said frictional wheel to the operating shaft, said lever being normally biased by spring force to swing in a direction where said frictional wheel abuts against the second rotating member; an electromagnetic device for swinging the swing lever by magnetically attracting the swing lever to a position where the frictional wheel abuts against the first rotating member in response to the initiation of the recording and for magnetically retaining said swing lever in aforementioned position, said electromagnetic device being adapted to retain the swing lever while the operating shaft of the variable resistor is rotated by the rotating force of the first rotating member and the variable resistor is changed in a direction to raise the recording level; a detecting circuit incorporated in said recording circuit for generating a characteristic output signal when the recording level is at a predetermined appropriate value, said electromagnetic device being operably associated with said detecting circuit to lose its magnetic force retaining the swing lever when said characteristic output signal is generated, whereby the swing lever is swingably returned by the elastic force of the tension spring; a lever means having one portion adjacent the swing lever for retaining the swing lever in a neutral position where the frictional wheel does not abut against either the first rotating member or the second rotating member, whereby the position of the variable resistor is not changed and recording level is maintained at the appropriate value to effect the recording of the tape, said lever means being adapted to be rotated to move said one portion away from a position where said one portion is engaged with the swing lever, said swing lever, upon being released from said lever means, being swingable by said spring force to a position where the frictional wheel abuts against the second rotating member, said frictional wheel being adapted to abut against the second rotating member while the variable resistor is changed in a direction to lower the recording level; and a control circuit for said motor including an electrical switch operable when the operating shaft is rotated to a position where the recording level is at zero level to stop the motor.

2. An endless magnetic tape automatic recording apparatus in accordance with claim 1 wherein said electromagnetic device includes a manually operated pushbutton switch, said electromagnetic device being adapted to attract said swing lever by magnetic force upon closing of the pushbutton switch at the initiation of the recording, the control circuit of said motor including a switch means actuatable by the swing lever during the period when the swing lever is retained by the electromagnetic device to energize said motor.

3. An endless magnetic tape automatic recording apparatus in accordance with claim 2 wherein said electrical switch is operably associated with said variable resistor to be opened when the operating shaft is in a position where said recording level is at zero level, said electricall switch being closed when the operating shaft is out of the aforementioned position whereby the control circuit of said motor is energized.

4. An endless magnetic tape automatic recording apparatus in accordance with claim 3 wherein said lever means is urged by a second spring means in the direction where it engages said swing lever, a stopper pin for stopping rotation of said lever means, said lever means being rotatable by said electromagnetic device against the elastic force of the spring means and being adapted to be retained by the electromagnetic device under its magnetic force, whereby when the lever means is retained by the electromagnetic device said swing lever is swung to abut said frictional wheel against said second rotating member, the electromagnetic device being adapted to release its retention of the lever means in response to closing of the electrical switch, the lever means being adapted to be returned by the elastic force of the spring member when released from said electromagnetic device, the swing lever being adapted to be swung by the returning lever means depressing the swing lever to thereby keep the frictional wheel away from the second rotating member.

5. An endless magnetic tape automatic recording apparatus in accordance with claim 4 wherein said first rotating member is said capstan, said second rotating member is a pulley, and a belt connects the pulley to the capstan for rotation of the pulley and capstan in opposite directions.

6. An endless magnetic tape automatic recording apparatus in accordance with claim 1 including a switch member adapted to be closed when the tape cartridge is in a predetermined position, the control circuit of said motor being adapted to be energized by closing of said switch member and said electromagnetic device being adapted to be energized by closing of the switch member to attract said swing lever.

7. An endless magnetic tape automatic recording apparatus in accordance with claim 6 wherein a lever member is rotatably provided in opposition to said endless magnetic tape cartridge brought to a predetermined record position, said lever member having a fingerlike portion and being biased by a spring member, said fingerlike portion being adapted to be depressed by the leading edge of the cartridge brought to the record position whereby the lever member is swung from a first position to a second position, said lever member being adapted to be retained in said second position by a second electromagnetic device under its magnetic force, said second electromagnetic device being adapted to release the retention of the lever member when said electric switch is closed when said recording level is at zero level, the lever member being adapted to be returned by the elastic force of the spring member from said second position to said first position and the fingerlike portion of the lever member being adapted to depress the leading edge of the cartridge when the lever member is released by said second electromagnetic device, whereby the cartridge is moved away from the record position, said switch member being adapted to be opened in response to the retraction of the cartridge to stop said motor.

8. An endless magnetic tape automatic recording apparatus in accordance with claim 7 wherein said first rotating member is a pulley and said second rotating member is said capstan, and a belt connects said pulley to said capstan for rotation of the pulley and capstan in opposite directions.